(12) United States Patent
Pan et al.

(10) Patent No.: US 9,098,607 B2
(45) Date of Patent: Aug. 4, 2015

(54) WRITING AND ANALYZING LOGS IN A DISTRIBUTED INFORMATION SYSTEM

(71) Applicant: International Business Machines Corporation, Armonk, NY (US)

(72) Inventors: Zhang Sheng Pan, Beijing (CN); Jin Liang Shi, Beijing (CN); Yan Sun, Beijing (CN); Bin Bin Wei, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 13/746,606

(22) Filed: Jan. 22, 2013

(65) Prior Publication Data

US 2013/0290519 A1 Oct. 31, 2013

(30) Foreign Application Priority Data

Apr. 27, 2012 (CN) .......................... 2012 1 0129918

(51) Int. Cl.
| | | |
|---|---|---|
| *G06F 15/16* | (2006.01) | |
| *G06F 11/34* | (2006.01) | |
| *G06F 17/30* | (2006.01) | |
| *G06F 11/14* | (2006.01) | |
| *G06F 11/07* | (2006.01) | |

(52) U.S. Cl.
CPC ...... *G06F 11/3404* (2013.01); *G06F 17/30174* (2013.01); *G06F 11/0766* (2013.01); *G06F 11/14* (2013.01); *G06F 11/1471* (2013.01)

(58) Field of Classification Search
CPC .............. G06F 207/87; G06F 11/1471; G06F 11/0766; G06F 11/14; G06F 17/30174; H04M 2250/60
See application file for complete search history.

(56) References Cited

U.S. PATENT DOCUMENTS

| | | | |
|---|---|---|---|
| 6,446,086 B1 | 9/2002 | Bartlett et al. | |
| 2003/0056200 A1 | 3/2003 | Li et al. | |
| 2005/0086664 A1* | 4/2005 | Sundaresan et al. | ........... 719/312 |
| 2007/0011156 A1 | 1/2007 | Maron | |
| 2007/0033233 A1 | 2/2007 | Hwang et al. | |
| 2008/0301200 A1 | 12/2008 | Doty et al. | |
| 2009/0106769 A1* | 4/2009 | Nakamura | ..................... 719/311 |
| 2009/0276469 A1 | 11/2009 | Agrawal et al. | |
| 2012/0290565 A1* | 11/2012 | Wana et al. | ................... 707/723 |

OTHER PUBLICATIONS

Dan Duchamp, "Analysis of Transaction Management Performance." Computer Science Department, Columbia University, New York, NY., pp. 177-190. Copyright 1989.

(Continued)

*Primary Examiner* — Krisna Lim
(74) *Attorney, Agent, or Firm* — Cantor Colburn LLP

(57) ABSTRACT

Writing logs in a distributed information system are provided. The logs are related to a transaction instance. A method includes retrieving a log proxy instance from a log server. The log proxy instance includes information related to the transaction instance and information related to currently running component in the transaction instance. The method also includes writing the logs for the transaction instance based on the log proxy instance. Aspects of the present invention further provide a method of facilitating writing logs and analyzing logs. Moreover, the embodiments further provide corresponding apparatuses and system.

14 Claims, 6 Drawing Sheets

(56) References Cited

OTHER PUBLICATIONS

Dennis Heidner, "Transaction Logging and Its Uses", Boeing Aerospace Company, Seattle Washington, pp. 2-34-1 to 2-34-25.

C. Mohan et al., Transaction Management in the R* Distributed Database Management System, IBM Research Center. ACM Transactions on Database Systems, vol. 11, No. 4, Dec. 1986, pp. 378-396.

* cited by examiner

US 9,098,607 B2

WRITING AND ANALYZING LOGS IN A DISTRIBUTED INFORMATION SYSTEM

PRIORITY

The present application claims priority to Chinese Patent Application No. 2012-10129918.7, filed on 27 Apr. 2012, and all the benefits accruing therefrom under 35 U.S.C. §119, the contents of which in its entirety are herein incorporated by reference.

FIELD OF INVENTION

The present invention relates generally to a distributed information system, and more specifically, to writing and analyzing logs in a distributed information system.

BACKGROUND

A complex distributed information system (for example, a system conforming to the Common Object Request Broker Architecture® CORBA system) generally integrates different products including multiple components that may be distributed across a network. In such a distributed information system, a transaction for a distributed application would usually involve a plurality of components, while each component writes logs individually.

An existing log system for such distributed information system may retrieve and store log files from different nodes or forward the log files to a log handler. In practice, it is desirable to analyze all logs on a particular transaction, which logs might be written by components distributed individually on a plurality of nodes.

SUMMARY

According to an embodiment of the present invention, there is provided a computer-implemented method for writing logs maintained by distributed components in a distributed information system. The logs are related to a transaction instance. The method includes retrieving a log proxy instance from a log server. The log proxy instance includes information related to the transaction instance and information related to a currently running component in the transaction instance. The method also includes writing the logs for the transaction instance based on the log proxy instance.

According to another embodiment of the present invention, there is provided a computer-implemented method for facilitating writing of a log maintained by a distributed component in a distributed information system. The method includes initializing a transaction instance and a log proxy instance based on a transaction type definition. The transaction type definition includes invoke relationships between a plurality of components having a type of transaction defined by the transaction type definition. The method also includes providing the log proxy instance to a currently running component in the transaction instance. The log proxy instance includes information related to the transaction instance and information related to the currently running component in the transaction instance.

According to another embodiment of the present invention, there is provided an apparatus for writing logs maintained by distributed components in a distributed information system. The logs are related to a transaction instance. The apparatus includes a module configured to retrieve a log proxy instance from a log server. The log proxy instance includes information related to the transaction instance and information related to a currently running component in the transaction instance. The apparatus also includes a module configured to write the logs for the transaction instance based on the log proxy instance.

According to yet another embodiment of the present invention, there is provided a log server for facilitating the writing of a log maintained by a distributed component in a distributed information system. The apparatus includes a module configured to initiate a transaction instance and a log proxy instance based on a transaction type definition. The transaction type definition includes invoke relationships between a plurality of components having a type of transaction defined by the transaction type definition. The apparatus also includes a means configured to provide the log proxy instance to a currently running component in the transaction instance. The log proxy instance includes information related to the transaction instance and information related to the currently running component in the transaction instance.

According to yet another embodiment of the present invention, there is provided a distributed information system. The distributed information system includes a plurality of components and a log server. Each of the plurality of components includes an apparatus for writing logs in the distributed information system according to the embodiments of the present invention, and the log server includes an apparatus for facilitating a plurality of components to write logs in the distributed information system and an apparatus for analyzing logs in the distributed information system according to the embodiments of the present invention.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and for completely conveying the scope of the present disclosure to those skilled in the art.

Presently, existing log systems have been unable to analyze logs for a particular transaction that are written by different components distributed on different nodes. In order to solve the technical problem existing in the prior art, embodiments of the present invention provide a technical solution for writing and analyzing logs in a distributed information system.

Figure 1:
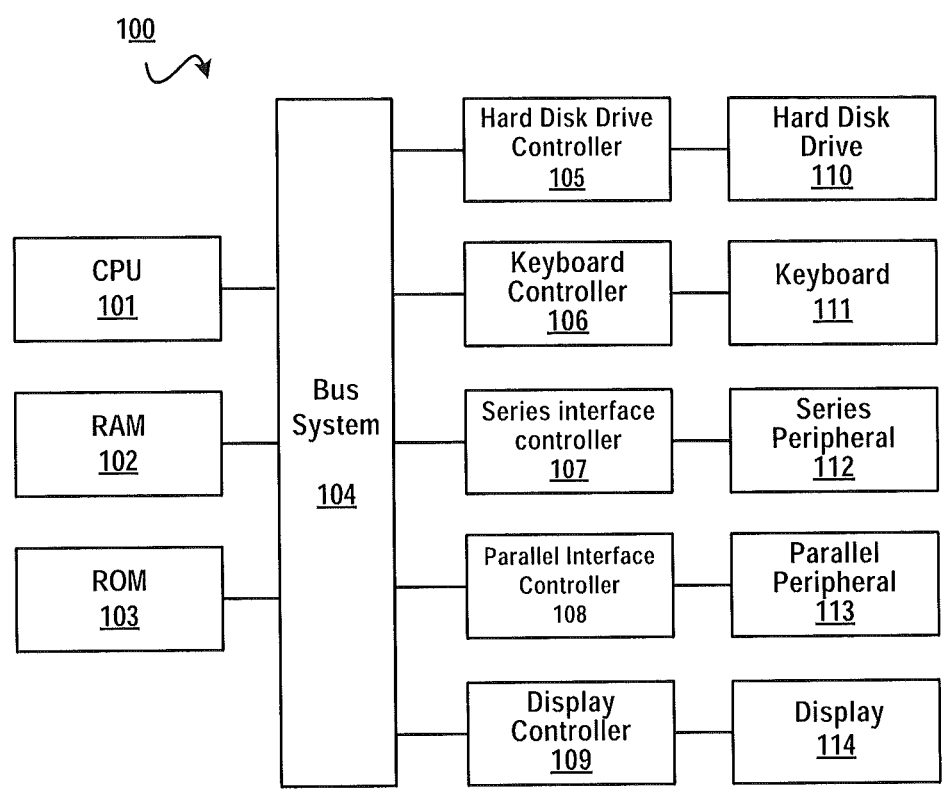
FIG. 1 shows an exemplary computer system 100 which is applicable to implement the embodiments of the present invention.

FIG. 1 shows an exemplary computer system 100 which is applicable to implement the embodiments of the present invention. As shown in FIG. 1, the computer system 100 may include: CPU (Central Process Unit) 101, RAM (Random Access Memory) 102, ROM (Read Only Memory) 103, system bus 104, hard drive controller 105, keyboard controller 106, aerial interface controller 107, parallel interface controller 108, display controller 109, hard drive 110, keyboard 111, serial peripheral equipment 112, parallel peripheral equipment 113 and display 114. Among above devices, CPU 101, RAM 102, ROM 103, hard drive controller 105, keyboard controller 106, serial interface controller 107, parallel interface controller 108 and display controller 109 are coupled to the system bus 104. Hard drive 110 is coupled to hard drive controller 105. Keyboard 111 is coupled to keyboard controller 106. Serial peripheral equipment 112 is coupled to serial interface controller 107. Parallel peripheral equipment 113 is coupled to parallel interface controller 108, and display 114 is coupled to display controller 109. It should be understood that the structure as shown in FIG. 1 is provided for illustrative purposes and is not intended to limit the scope of the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Various embodiments according to the present invention provide a technical solution of writing and analyzing logs in a distributed information system, which is capable of writing logs and analyzing logs for a particular transaction instance. The term "transaction instance" herein refers to an instance of a particular transaction type; particularly in a system allowing concurrency, a plurality of concurrent transaction instances may exist for a particular transaction type.

Figure 2:
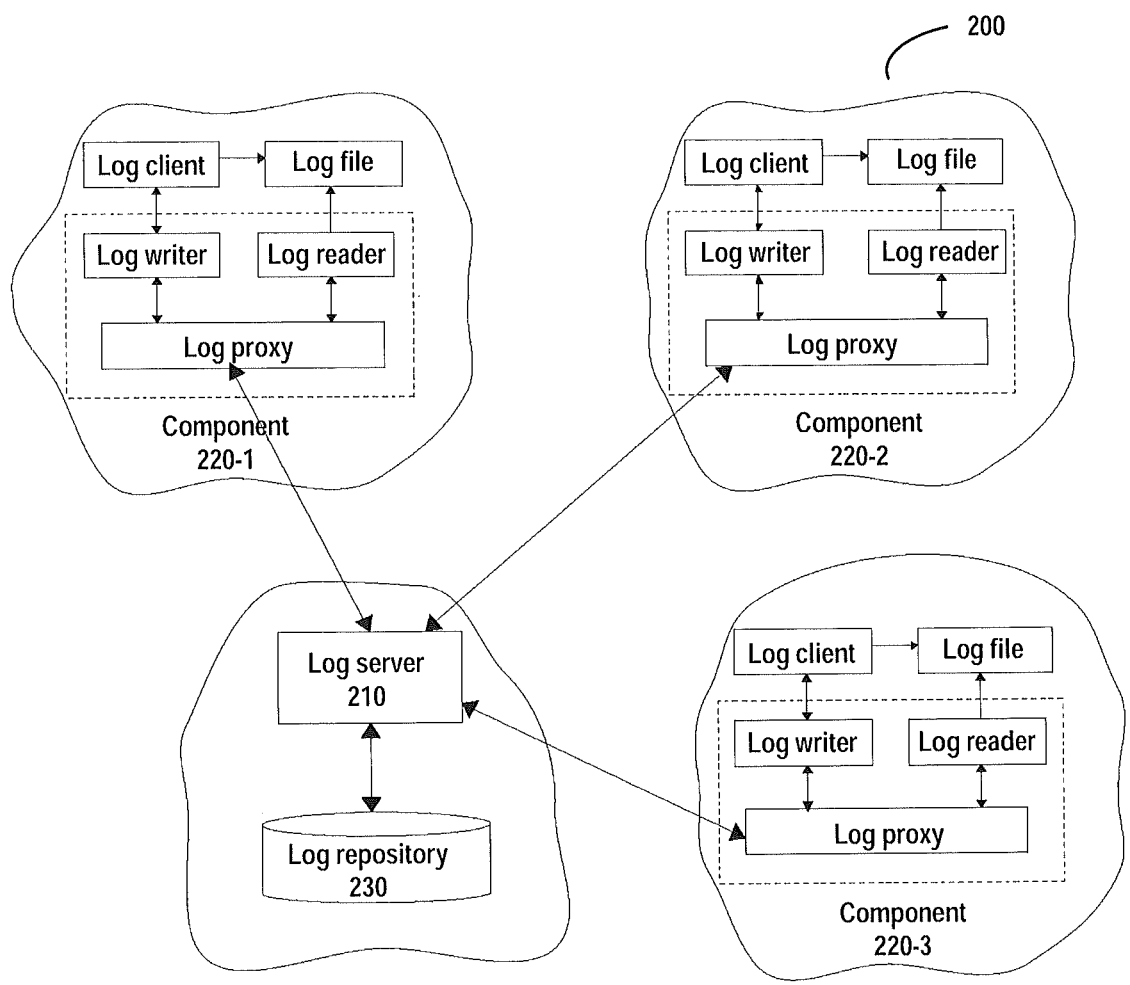
FIG. 2 shows a schematic architecture of a distributed information system according to one embodiment of the present invention.

FIG. 2 shows a schematic architecture of a distributed information system according to one embodiment of the present invention.

As shown in FIG. 2, a distributed information system 200 comprises a log server 210 and a plurality of components 220 running an application. As an example, FIG. 2 shows three components 220-1, 220-2, and 220-3 (COMP_1, COMP_2, and COMP3), however, it should be understood that an actual distributed information system may have more or less components, and the number of components is not limited by the described exemplary embodiments.

A log server 210 is provided for managing records in logs on each component and capable of collecting the logs written in each component and performing analysis. The log server 210 is connected to a log repository 230. During the system initialization period, the log server 210 stores the information regarding the components and a transaction type definition in the log repository 230 as initialization information. The transaction type definition may include information regarding the invoke information between components in transactions of that type. The log repository 230 further stores each running transaction instance and a corresponding log proxy instance.

According to various embodiments of the present invention, a transaction instance contains all behaviors in a transaction type, such as START, END, INVOKE COMP-next, RETURN FROM COMP_previous, and the like. For example, an example of a transaction instance may be described below in the Extensible Markup Language XML format:

```
<transaction_instance id=N, type=transaction1>
    <component name=COMP_1>
        <sequence>
            1
        </sequence>
        <action>
            INVOKE COMP_N
        </action>
        <timestamp>
            YYYYYMMDDHHMMSS
        </timestamp>
    </component>
    ...
    <component name=COMP_N>
        <sequence>
            N
        </sequence>
        <action>
            START
        </action>
        <timestamp>
            YYYYYMMDDHHMMSS
        </timestamp>
    </component>
</transaction_instance>
```

Each transaction instance has a corresponding log proxy instance which at least contains information related to the transaction instance and information related to currently running component in the transaction instance. For example, an example of a log proxy instance may be described below in the XML format:

```
<log proxy instance >
    <transaction type="XXX"/>
    <transaction ID="XXX"/>
    <transaction SEQ="XXX"/>
    <current component name="xxx"/>
    <current request ID="XXX">
</log proxy instance >
```

In this example, information related to the transaction instance includes transaction type of the transaction instance; transaction ID uniquely identifying the transaction instance, and information related to currently running component in the transaction instance includes information related to the invoke sequences of the current components in the transaction instance (transaction SEQ, indicating the invoke sequence numbers of components), names of current components (current component names), and current request ID (a request ID encapsulated in a transfer protocol request message (for example, it is a part of a request message header of a General Inter ORB Protocol (GIOP), for uniquely identifying the request message).

It should be noted that although advantageous effects are achieved in the present description by using the above particular information as the information related to the transaction instance and specific examples for the information related to the currently running component in the transaction instance, it should be understood that the contents and forms of such information are only illustrative, and those skilled in the art may adopt other information contents/forms as required, or add other information contents/forms, or omit some information therein. Thus, the examples provided here do not constitute a limitation to the scope of the present invention.

In the embodiment shown in FIG. 2, each of the components 220-1, 220-2, and 220-3 comprises a conventional log client for requesting for writing logs. According to system architecture of an embodiment of the present invention, the log server 210 communicates with the log client through a log proxy. For example, in a transaction instance, the log client requests a log writer to write logs. Upon receipt of the request, the log writer exchanges information with the log proxy and writes the logs on the transaction instance based on a log proxy instance corresponding to the current transaction instance, wherein the log proxy instance is retrieved by the log proxy for the component from the log server 210. The log proxy instance at least contains information related to the transaction instance and information related to the currently running component in the transaction instance. For example, when the log server 210 receives a request for analyzing a request for logs on a particular transaction instance, the log server 210 requests a log reader to retrieve all log lines related to the transaction instance from the log files through the log proxy in each component based on the transaction instance in the log repository 230, and then performs analysis processing to the retrieved log lines at least based on the invoke relationships between components of the transaction instance as stored in the log repository 230.

Hereinafter, referring to FIGS. 3 and 4, FIGS. 3 and 4 describe the method of writing logs in a distributed information system according to the embodiments of the present invention from the perspective of components and the perspective of log server, respectively. Then, a specific example of performing log processing across a plurality of components during a transaction period will be described with reference to FIG. 4.

Figure 3:
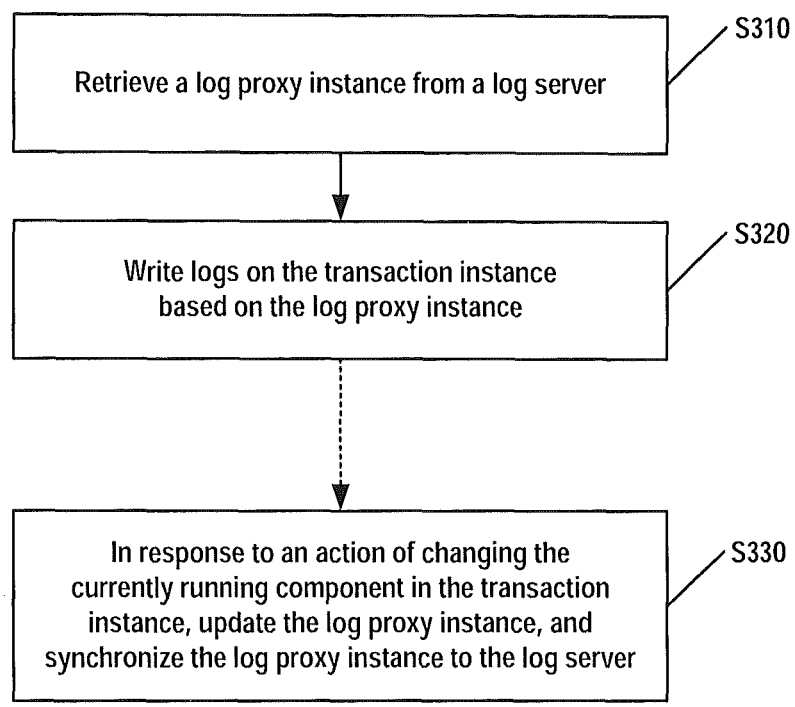
FIG. 3 schematically shows a flow chart of a method of writing logs in a distributed information system according to an exemplary embodiment of the present invention.

FIG. 3 schematically shows a flow chart of a method of writing logs in a distributed information system according to an exemplary embodiment of the present invention.

As shown in FIG. 3, in step S310, a log proxy instance is retrieved from a log server, the log proxy instance at least comprising information related to a transaction instance and information related to currently running component in the transaction instance.

In one implementation, a log client of a current log component requests a log writer to write logs. The log proxy of the current component retrieves a log proxy instance recorded in a log repository from a log server according to the request from the log writer. The retrieved log proxy instance, for example, is in the XML format as above mentioned.

In step S320, logs on the transaction instance are written based on the log proxy instance.

In one implementation, the retrieved log proxy instance is combined with the log writer as a property of the log writer for writing the logs on the current transaction instance. Each piece of logs includes tags for the information retrieved from the log proxy instance: information related to the transaction instance; and information related to currently running component in the transaction instance. Each piece of logs further comprises tags for various kinds of information generally contained in log, for example, one or more tag information selected from the following groups: timestamp, action; log level, etc.

For example, each line of a written log may for example contain the following information tags:

[TRANSACTION TYPE] [TRANSACTION ID] [SEQUENCE]
[TIMESTAMP] [ACTION|LOG Level]
wherein:
TRANSACTION TYPE indicates the name of the transaction type;
TRANSACTION ID indicates an identification that uniquely identifies the transaction instance;
SEQUENCE indicates invoke relationships of the current components in the transaction instance;
TIMESTAMP indicates the timestamp of this piece of log information, for example, YYYYMMDDHHMMSS;
ACTION indicates a transaction behavior. For example, the action may be START, END, INVOKE, or RETURN.
LOG Level describes the level of log, for example, information (INFO), warning (WARNING), debug (DEBUG), etc.

For a particular component, the tags [TRANSACTION TYPE] [TRANSACTION ID] [SEQUENCE] of all log lines in the same log file with respect to a same transaction instance are identical. An example of the tags for a piece of log may be:
[TRANSACTION1] [000001] [2] [20100707160000] [INFO]

In response to change of a current running component in the transaction instance, the log proxy instance is updated in step S330 and the updated log proxy instance is synchronized to the log server.

Mutual invoke between components with respect to a transaction instance could cause change of currently running component. Actions possibly involved in changing currently running component in the transaction instance comprise: invoking a next component, returning to a preceding component; starting the current component; and ending the current component.

Take the action of invoking a next component as an example. For example, component COMP_1 invokes component COMP_2, and it is the component COMP_1 that initiates the invoke action that updates the log proxy instance, for example, updating the current request ID. Next, the component COMP_1 synchronizes the updated log proxy instance to the log server. The component COMP_2 in the start action retrieves the updated log proxy instance from the log server, wherein the "current request ID" in the log proxy instance is identical to the request identification in the request message header received by the component COMP_2 from the component COMP_1 and updates the log proxy instance retrieved from the log server, for example, adding the transaction SEQ in the log proxy instance by 1, updating the current component name to the current component COMP_2. Next, the component COMP_2 synchronizes the updated log proxy instance to the log server. The component COMP_2 writes logs based on the updated log proxy instance.

Figure 4:
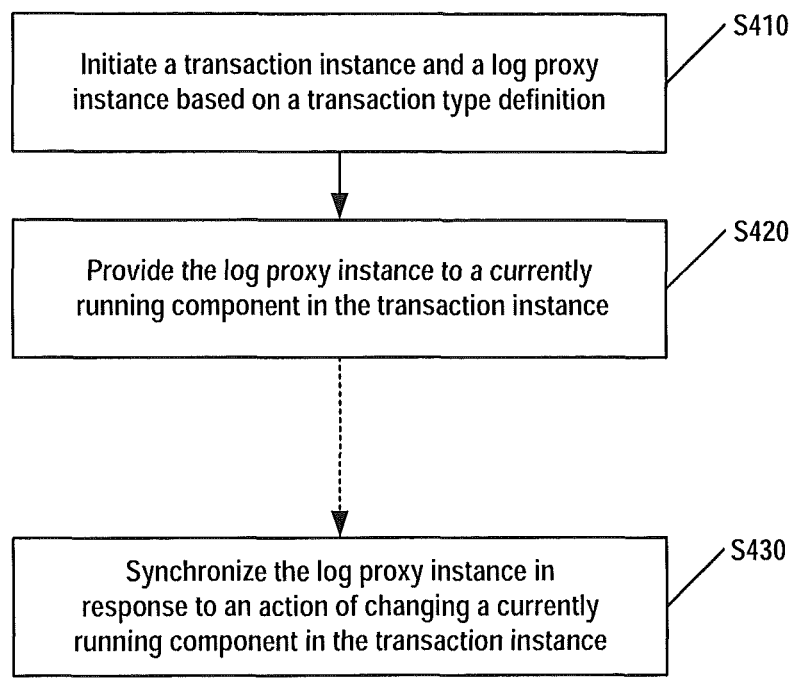
FIG. 4 schematically shows a method of facilitating a plurality of components to write logs in a distributed information system according to an exemplary embodiment of the present invention.

FIG. 4 schematically shows a method of facilitating a plurality of components to write logs in a distributed information system according to an exemplary embodiment of the present invention.

As illustrated in FIG. 4, in step S410, a transaction instance and a log proxy instance are initiated based on a transaction type definition, wherein the transaction type definition includes invoke relationships between a plurality of components in that type of transaction.

During the system initialization procedure, the log server registers information of each component and transaction type information with a log repository. In a distributed information system, each component may be deployed at different computer nodes and has its own log file. For example, a component may be described below in the XML format:

```
<component>
    <name>
        XXX
    </name>
    <IP>
        XXXX
    </IP>
</component>
```

The transaction type definition includes invoke relationships between a plurality of components in that type of transaction. For example, the transaction type may described below in XML format:

```
<transaction type>
    <name>
        XXX
    </name>
    <description>
        XXX
    </description>
    <components>
        COMP_1, COMP_2... COMP_n
    </components>
    <relations>
        <relation source= COMP_1, target= COMP_2>
        ...
        <relation source= COMP_n-1, target= COMP_n>
    </relations>
</transaction type>
``` wherein the field "components" describes the components involved in that type of transaction and the field "relations" describe the invoke relationships between the components involved in that type of transaction.

In step S402, a log proxy instance is provided to a currently running component in the transaction instance, the log proxy instance at least comprising information related to the transaction instance and the information related to the currently running component in the transaction instance.

Here, the information related to the transaction instance may contain an ID uniquely identifying the transaction instance and the type of the transaction instance. The information related to the currently running component in the transaction instance may contain information related to the invoke sequence of the current component in the transaction instance, the name of the current component, and request ID.

In response to the action of changing the currently running component in the transaction instance, in step S430, the log proxy instance is synchronized with the component.

In an embodiment, changing the currently running component in the transaction instance may include invoking a next component, returning to a previous component, starting the current component, and ending the current component.

Figure 5:
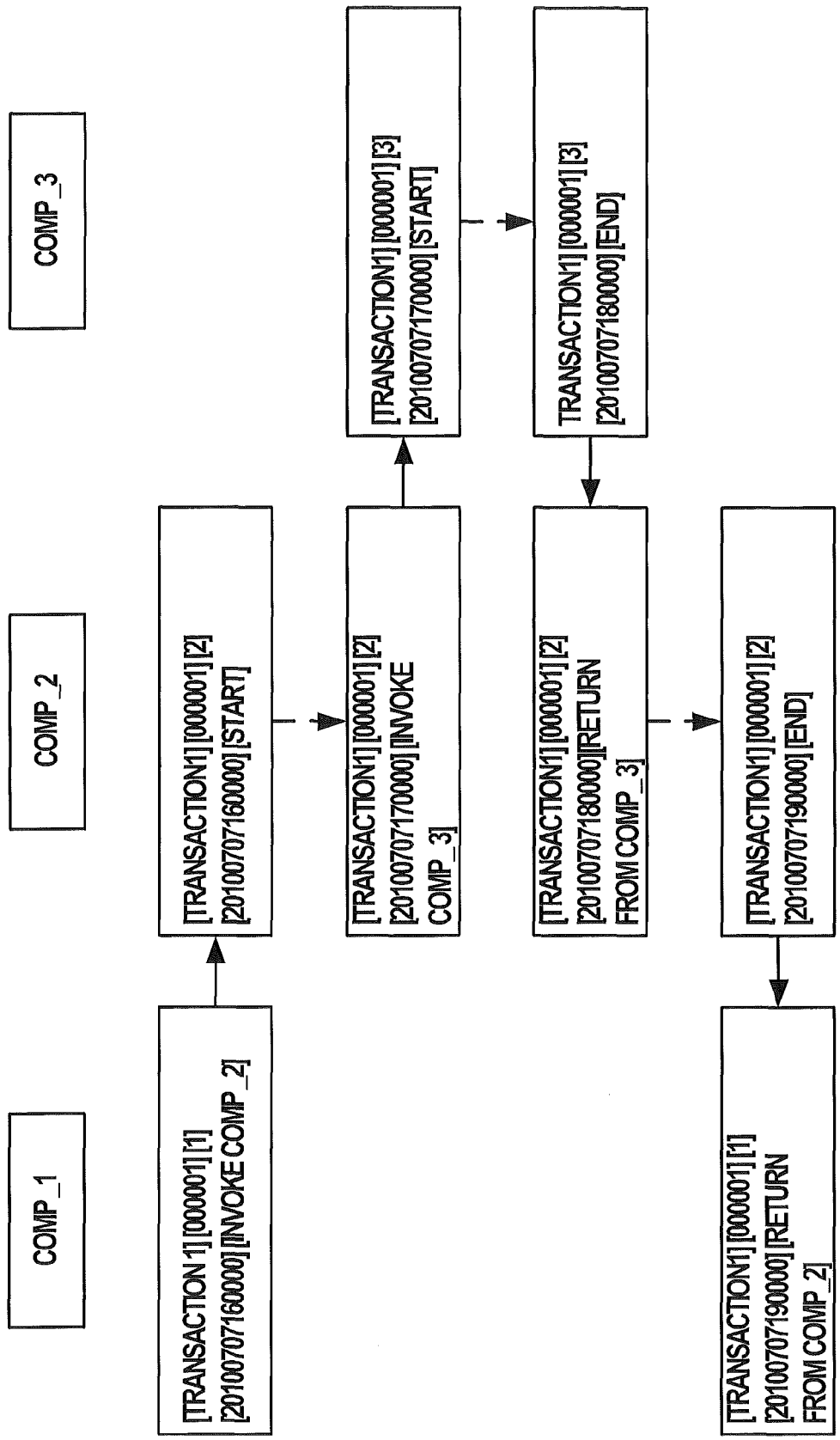
FIG. 5 schematically shows a specific example of performing log processing across a plurality of components during a transaction period.

FIG. 5 schematically shows a specific example of performing log processing across a plurality of components during a transaction period.

As shown in FIG. 5, component COMP_1 is the initiator of a transaction instance. In this transaction instance, component COMP_1 will invoke component COMP_2, and the component COMP_2 will then invoke COMP_3.

The log server initiates the transaction instance and log proxy instance based on a transaction type definition and registers them with a log repository.

The log client of component COMP_1 requests the log writer to write logs. The log writer retrieves a log proxy instance described below in XML format from the log server via the log proxy:

```
<log proxy instance>
    <transaction type="TRANSACTION1"/>
    <transaction ID="000001"/>
    <transaction SEQ="1"/>
    <current component name="COMP_1 "/>
    <current request ID="000001">
</log proxy instance >
```

The log write uses the information in the log proxy instance to generate log tags and writes them into the log file of the component COMP_1. For example, the generated logs may contain such tags:

[TRANSACTION1] [000001] [1] [20100707150500] [START]

Here, according to one embodiment of the present invention, in the transaction instance, each piece of logs of the component COMP_1 is headed with the tags of [TRANSACTION1] [000001] [1].

In the log server, a corresponding XML node may be created in the transaction instance and written into a corresponding transaction instance as recorded in the log repository:

```
<component name=COMP_1>
    <sequence>
        1
    </sequence>
    <action>
        START
    </action>
    <timestamp>
        20100707150500
    </timestamp>
</component>
```

When the component COMP_1 invokes the component COMP_2, the invoke action will be written into the log file of the component COMP_1, for example:

[TRANSACTION1] [000001] [1] [20100707160000] [INVOKE COMP_2]

The log server correspondingly creates an XML node and writes it into a corresponding transaction instance recorded in the log repository:

```
<component name=COMP_1>
    <sequence>
        1
    </sequence>
    <action>
        INVOKE COMP_2
    </action>
    <timestamp>
        20100707160000
    </timestamp>
</component>
```

Preferably, when initiating an invoke action, the component COMP_1 may update the "current request ID" in the log proxy instance to the log server based on the request ID encapsulated in a transfer protocol request message, thereby supporting invoking COMP_2 in a concurrent transaction state.

The log client of the component COMP_2 requests the log writer to write logs. The component COMP_2 retrieves the log proxy instance from the log server via a log proxy, wherein the "current request ID" in the log proxy instance is identical to the request identification in the request message header received by the component COMP_2 from the component COMP_1. The log proxy instance is updated by adding the value of its "transaction SEQ" by 1 and updating "current component name" to COMP_2. Thereafter, the component COMP_2 synchronizes the updated log proxy instance to the log server via its log proxy. The log writer of the component COMP_2 generates log tags based on the information of the current log proxy instance and writes the "start" action into the log file of COMP_2. For example, the generated log may include such tags:

[TRANSACTION1] [000001] [2] [20100707160000] [START]

Here, according to one embodiment of the present invention, in the transaction instance, each piece of logs of the component COMP_2 is headed with tags of [TRANSACTION1] [000001] [2].

In the log server, a corresponding XML node may be created in the transaction instance and written into a corresponding transaction instance as recorded in the log repository:

```
<component name=COMP_2>
    <sequence>
        2
    </sequence>
    <action>
        START
    </action>
    <timestamp>
        20100707160000
    </timestamp>
</component>
```

When the component COMP_2 invokes the component COMP_3, the invoke action will be written into the log file of the component COMP_2, for example:

[TRANSACTION1] [000001] [2] [20100707170000] [INVOKE COMP_3]

The log server correspondingly creates an XML node and writes it into a corresponding transaction instance recorded in the log repository:

```
<component name=COMP_3>
    <sequence>
        2
    </sequence>
    <action>
        INVOKE COMP_3
    </action>
    <timestamp>
        20100707170000
    </timestamp>
</component>
```

In an embodiment, the component COMP_2 uploads the generated request ID to the log server, and the log server updates the "current request ID" in the log proxy instance, thereby supporting invoking COMP_3 in a concurrent transaction state. For example, if the generated request ID is 000002, the current log proxy instance is:

```
<log proxy instance>
    <transaction type="TRANSACTION1"/>
    <transaction ID="000001"/>
    <transaction SEQ="2"/>
    <current component name="COMP_2"/>
    <current request ID="000002">
</log proxy instance>
```

The log client of the component COMP_3 requests the log writer to write logs. The component COMP_3 retrieves a log proxy instance from the log server via a log proxy, wherein the "current request ID" in the log proxy instance is identical to the request identification in the request message header received by the component COMP_2 from the component COMP_1. The log proxy instance is updated by adding the value of its "transaction SEQ" by 1 and updating "current component name" to COMP_3. Thereafter, the component COMP_3 synchronizes the updated log proxy instance to the log server via the current log proxy, and the "start" action is recorded into the log file of COMP_3. For example, the generated log may contain such tags:

[TRANSACTION1] [000001] [3] [20100707170000] [START]

Here, according to one embodiment of the present invention, in that transaction instance, each piece of logs for the component COMP_3 is headed with tags of [TRANSACTION1] [000001] [3].

In the log server, a corresponding XML node may be created in the transaction instance and written into a corresponding transaction instance recorded in the log repository:

```
<component name=COMP_3>
    <sequence>
        3
    </sequence>
    <action>
        START
    </action>
    <timestamp>
        20100707170000
    </timestamp>
</component>
```

When the component COMP_3 completes its task, it will write a piece of log for an end action in the log file:

[TRANSACTION1] [000001] [3] [20100707180000] [END]

In the log server, an XML node is correspondingly created and written in a corresponding transaction instance recorded in the log repository:

```
<component name=COMP_3>
    <sequence>
        3
    </sequence>
    <action>
        END
    </action>
    <timestamp>
        20100707180000
    </timestamp>
</component>
```

The log writer of the component COMP_2 writes logs based on the information of its log proxy instance:

[TRANSACTION1] [000001] [2] [20100707180000] [RETURN FROM COMP_3]

In the log server, a corresponding XML node may be created in the transaction instance and written into a corresponding transaction instance as recorded in the log repository:

```
<component name=COMP_2>
    <sequence>
        2
    </sequence>
    <action>
        RETURN FROM COMP_3
    </action>
    <timestamp>
        20100707180000
    </timestamp>
</component>
```

When the component COMP_2 completes its task, it writes a piece of log for an end action in the log file:

[TRANSACTION1] [000001] [2] [20100707190000] [END]

The log server correspondingly creates an XML node and writes it into a corresponding transaction instance recorded in the log repository:

```
<component name=COMP_2>
    <sequence>
        2
    </sequence>
    <action>
        END
    </action>
    <timestamp>
        20100707190000
    </timestamp>
</component>
```

The log writer of the component COMP_1 writes a log based on the information of its log proxy instance:

[TRANSACTION1] [000001] [2] [20100707190000] [RETURN FROM COMP_2]

In the log server, a corresponding XML node may be created in the transaction instance and written into a corresponding transaction instance recorded in the log repository:

```
<component name=COMP_1>
    <sequence>
        1
    </sequence>
    <action>
        RETURN FROM COMP_2
    </action>
    <timestamp>
        20100707190000
    </timestamp>
</component>
```

When the component COMP_1 completes its task, it will write a piece of log for an end action into the log file:
[TRANSACTION1] [000001] [1] [20100707200000] [END]

In the log server, a corresponding XML node may be created in the transaction instance and written into a corresponding transaction instance recorded in the log repository:

```
<component name=COMP_1>
    <sequence>
        1
    </sequence>
    <action>
        END
    </action>
    <timestamp>
        20100707200000
    </timestamp>
</component>
```

What is described above with reference to FIG. 5 is a specific example of performing log processing across a plurality of components during a transaction period according to one embodiment of the present invention. It should be noted that in the example as described with reference to FIG. 5, each component responds to an action of changing a currently running component in the transaction instance, the component receiving the action updates the retrieved log proxy instance, and synchronizes it to the log server, and further each component maintains a same log proxy instance with respect to a transaction instance. In this case, the action of changing the currently running component in the transaction instance may be merely determined as the action of invoking the next component. However, it should be understood that the log proxy instance may be updated and synchronized to the log server by a component initiating the action. In this case, the action of changing the currently running component in the transaction instance may be determined as some items of the actions of invoking a next component, returning to a previous component, starting the current component, and ending the current component.

Further, it should be noted that although the embodiment of FIG. 5 provides that the invoke sequences transaction SEQ of the log proxy instances for the same transaction instance are identical, it is also possible to assign consecutive sequence numbers to the components during the invoke process (for example, when returning from COMP_3 to COMP_2, the transaction SEQ of the COMP_2 is updated to 4; when returning from COMP_2 to COMP_1, the transaction SEQ of COMP_1 is updated to 5), so as to indicate the sequence of the current component in the whole invoke process. Such setting may be advantageous to some log analyses. Thus, the present application does not exclude such transformations and improvements.

Thus, those skilled in the art would appreciate that according to the principles proposed in the present invention, the update conditions, update process, and update content for updating the log proxy instance may be designed as required, while these transformations and improvements do not depart from the spirit and essence of the present invention.

Figure 6:
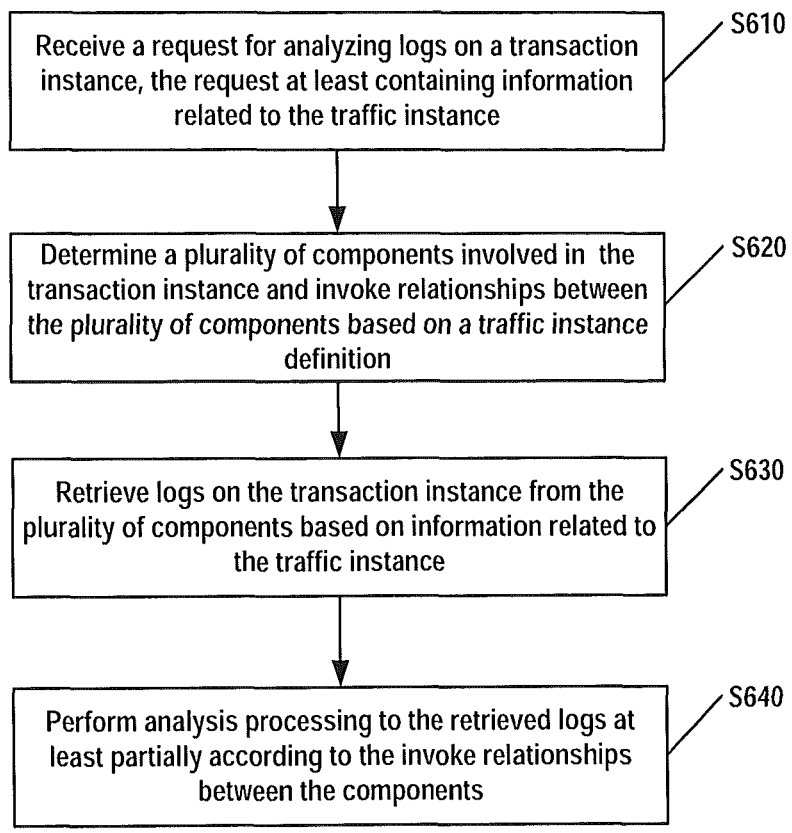
FIG. 6 schematically shows a flow chart of a method of analyzing logs in a distributed information system according to an exemplary embodiment of the present invention.

FIG. 6 schematically shows a flow chart of a method of analyzing logs in a distributed information system according to an exemplary embodiment of the present invention.

In step S610, a request for analyzing logs on a transaction instance is received, the request at least comprising information related to the transaction instance.

For example, the log server may retrieve a type of the transaction instance and an ID uniquely identifying the transaction instance from the transaction instance recorded in the log repository based on the request.

In step S620, a plurality of components involved with the transaction instance and invoke relationships therebetween are determined based on a transaction instance definition.

For example, in the example shown in FIG. 5, the log server may determine that the transaction instance involves component COMP_1, COMP_2, and COMP_3, and their invoke relationships are: COMP_1 invokes COMP_2, COMP_2 invokes COMP_3, COMP_3 returns to COMP_2, and COMP_2 returns COMP_1, and then the invoke ends.

In step S630, logs related to the transaction instance are retrieved from the plurality of components based on information related to the transaction instance.

In one embodiment, all logs with the tags of the type of the transaction instance and the identification for uniquely identifying the ID of the transaction instance are read from the determined log files of respective components. For example, in the example of FIG. 5, the log server retrieves all logs headed with the tags of [TRANSACTION1] [000001] from the log files using the log readers via the log proxies of respective components COMP_1, COMP_2, and COMP_3.

In step S640, analysis processing is performed to the retrieved logs at least partially according to the invoke relationships between components.

In one embodiment, the log server may order the retrieved log entries according to the invoke relationships between components according to the transaction instance recorded in the log repository. Additionally, analysis processing may be performed for the logs on each component in accordance with the timestamp sequence of the log. In response to an action of changing the currently running component in the transaction instance as recorded in a piece of log, the logs retrieved from the next component are continuously processed based on the invoke relationships between components. The action of changing the currently running component in the transaction instance comprises one or more items as selected from the following group: action of invoking a next component; action of returning to a previous component; action of starting the current component; and action of ending the current component.

Specifically, in one implementation, from log file entries from the first component, all the log file entries are ordered based on the information of timestamp. When the action is an invoke action, a save point is set to start ordering the log entries from the invoked component. When the action is a return action, then the process returns to the immediately previous save point to process the log entries from the component initiating the invoke action. Execution continues in a process similar to the above till all log entries retrieved for the transaction instance are completely processed.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for writing logs maintained by distributed components in a distributed information system, the logs being related to a transaction instance, the method comprising:
   retrieving a log proxy instance from a log server, the log proxy instance comprising information related to the transaction instance and information related to a currently running component in the transaction instance;
   writing the logs for the transaction instance based on the log proxy instance; and
   in response to an action of changing the currently running component in the transaction instance, updating and synchronizing the log proxy instance to the log server by at least one of a component initiating the action and a component receiving the action.

2. The computer-implemented method according to claim 1, wherein:
   the information related to the transaction instance includes at least one of:
   an identification uniquely identifying the transaction instance; and
   a type of the transaction instance.

3. The computer-implemented method according to claim 1, wherein:
   the information related to the currently running component in the transaction instance includes at least one of:
   information related to an invoke relationship of the currently running component in the transaction instance;
   a name of the currently running component; and
   a request identification.

4. The computer-implemented method according to claim 1, wherein:
   the action of changing the currently running component in the transaction instance comprises at least one of an:
   action of invoking a next component in the transaction instance;
   action of returning to a previous component in the transaction instance; and
   action of ending the currently running component in the transaction instance.

5. The computer-implemented method according to claim 1, wherein each piece of the logs includes tag information including:
   the information related to the transaction instance; and
   the information related to the currently running component in the transaction instance.

6. The computer-implemented method according to claim 5, wherein the tag information further includes:
   a timestamp;
   an action; and
   a log level.

7. A computer-implemented method for facilitating writing of a log maintained by a distributed component in a distributed information system, comprising:
   initiating a transaction instance and a log proxy instance based on a transaction type definition, wherein the transaction type definition includes invoke relationships between a plurality of components having a type of transaction defined by the transaction definition;
   providing the log proxy instance to a currently running component in the transaction instance, the log proxy instance comprising information related to the transaction instance and information related to the currently running component in the transaction instance; and
   in response to an action of changing the currently running component in the transaction instance, updating and synchronizing the log proxy instance to a log server by at least one of a component initiating the action and a component receiving the action.

8. An apparatus for writing logs maintained by distributed components in a distributed information system, the logs being related to a transaction instance, the apparatus comprising:
   a module, executable by a computer processor, configured to retrieve a log proxy instance from a log server, the log proxy instance comprising information related to the transaction instance and information related to a currently running component in the transaction instance; and
   a module, executable by the computer processor, configured to write the logs for the transaction instance based on the log proxy instance; and
   a module, executable by the computer processor, configured to update and synchronize the log proxy instance to the log server by a component receiving or initiating an action in response to changing the currently running component in the transaction instance.

9. The apparatus according to claim 8, wherein:
   the information related to the transaction instance includes at least one of:
   an identification uniquely identifying the transaction instance; and
   a type of the transaction instance.

10. The apparatus according to claim 8, wherein:
    the information related to the currently running component in the transaction instance includes at least one of:
    information related to an invoke relationship of the currently running component in the transaction instance;
    a name of the currently running component; and
    a request identification.

11. The apparatus according to claim 8, wherein:
    the action of changing the currently running component in the transaction instance comprises at least one of an:
    action of invoking a next component in the transaction instance;

action of returning to a previous component in the transaction instance; and action of ending the currently running component in the transaction instance.

12. The apparatus according to claim 8, wherein each piece of the logs includes tag information including:
   the information related to the transaction instance; and
   the information related to the currently running component in the transaction instance.

13. The apparatus according to claim 12, wherein the tag information further includes:
   a timestamp;
   an action; and
   a log level.

14. A log server apparatus for facilitating the writing of a log maintained by a distributed component in a distributed information system, comprising:
   a module, executable by a computer processor, configured to initiate a transaction instance and a log proxy instance based on a transaction type definition, wherein the transaction type definition includes invoke relationships between a plurality of components having a type of transaction defined by the transaction type definition; and a means configured to provide the log proxy instance to a currently running component in the transaction instance, the log proxy instance comprising information related to the transaction instance and information related to the currently running component in the transaction instance; and a module, executable by the computer processor, configured to update and synchronize the log proxy instance to a log server by a component initiating an action in response to changing the currently running component in the transaction instance.

* * * * *